US010332107B2

(12) United States Patent
Ferguson et al.

(10) Patent No.: US 10,332,107 B2
(45) Date of Patent: *Jun. 25, 2019

(54) SECURE SHELL FILE TRANSFER PROTOCOL KEY ADMINISTRATION (71) Applicant: MasterCard International Incorporated, Purchase, NY (US)

(72) Inventors: Douglas Paul Ferguson, Richmond Heights, MO (US); Weihua Zhou, Chesterfield, MO (US); Srinivas M. Gummididala, Telangana (IN)

(73) Assignee: MasterCard International Incorporated, Purchase, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/278,368

(22) Filed: Sep. 28, 2016

(65) Prior Publication Data

US 2017/0093820 A1 Mar. 30, 2017

Related U.S. Application Data (63) Continuation-in-part of application No. 14/867,253, filed on Sep. 28, 2015, now Pat. No. 10,069,817.

(51) Int. Cl.
*H04L 29/06* (2006.01)
*G06Q 20/38* (2012.01)
*H04L 9/08* (2006.01)

(52) U.S. Cl.
CPC ......... *G06Q 20/3829* (2013.01); *H04L 9/088* (2013.01); *H04L 9/0822* (2013.01);
(Continued)

(58) Field of Classification Search
CPC .... H04L 63/06; H04L 63/0815; H04L 63/083
See application file for complete search history.

(56) References Cited

U.S. PATENT DOCUMENTS

2015/0222604 A1    8/2015    Ylonen

FOREIGN PATENT DOCUMENTS

WO    2013093209 A1    6/2013
WO    2015042604 A1    3/2015

OTHER PUBLICATIONS

Patent Cooperation Treaty, International Search Report for PCT/US2016/054083, dated Dec. 8, 2016, pp. 1-4.
(Continued)

*Primary Examiner* — Dao Q Ho
(74) *Attorney, Agent, or Firm* — Sheppard Mullin Richter & Hampton LLP (57) ABSTRACT Systems and methods of centralized, global secure shell (SSH) key administration and management are provided, where a secure file transfer protocol (SFTP) application programming interface (API) can be leveraged to integrate centralized SSH key administration across any and all SFTP API or other file transfer installations. This allows an administrative entity to use a central server, for example, to perform client and server SSH key administration and management (e.g., SSH key creation, removal, distribution, and expiration reporting/tracking), scheduling, configuration updates, and the like across an unlimited number of file transfer installations and platforms (and therefore, is also scalable). A single management interface can be utilized for viewing and updating SSH keys for applications, and SSH keys can be propagated to application servers where the SSH keys can be activated based on a scheduled time.

8 Claims, 5 Drawing Sheets (52) U.S. Cl.
CPC .......... *H04L 9/0825* (2013.01); *H04L 9/0863* (2013.01); *H04L 9/0891* (2013.01); *H04L 9/0894* (2013.01); *H04L 63/0428* (2013.01); *H04L 63/061* (2013.01); *H04L 63/083* (2013.01); *H04L 63/168* (2013.01)

(56) References Cited

OTHER PUBLICATIONS

Villanueva, John Carl, "Managed File Transfer and Network Solutions—What Is an SFTP Key?" JSCAPE Blog, Dec. 9, 2014, <http://www.jscape.comiblog.what-is-an-sftp-key> (Retrieved from the World Wide Web on Dec. 5, 2018).
Office Action in Canadian Patent Application No. 3,000,225, dated Nov. 30, 2018.

TRANSMIT REQUEST TO IMPORT A PUBLIC SSH KEY ASSOCIATED WITH AN SFTP SERVER THAT OWNS A CORRESPONDING PRIVATE SSH KEY VIA AN ADMINISTRATIVE PORTAL ADAPTED TO MANAGE A PLURALITY OF STFP SERVERS

306

TRANSMIT REQUEST TO ASSOCIATE THE PUBLIC SSH KEY WITH ONE OR MORE SFTP API SERVERS TO CAUSE THE PUBLIC SSH KEY TO BE SENT TO EACH OF THE ONE OR MORE SFTP API SERVERS, WHEREIN EACH OF THE ONE OR MORE STFP API SERVERS IS ASSOCIATED WITH A CORRESPONDING ONE OF THE PLURALITY OF STFP SERVERS

308

MAINTAIN THE PUBLIC SSH KEY AT THE ADMINISTRATIVE PORTAL

SECURE SHELL FILE TRANSFER PROTOCOL KEY ADMINISTRATION

RELATED APPLICATIONS

This application is a continuation in part of U.S. patent application Ser. No. 14/867,253 filed on Sep. 28, 2015, the content of which is incorporated herein by reference in its entirety.

TECHNICAL FIELD

The present disclosure is generally related to secure file transfer. More particularly, the present disclosure is directed to systems and methods for supporting centralized secure shell (SSH) key administration in the context of an SSH file transfer protocol.

BACKGROUND

Applications utilized by industry entities, businesses, and the like often rely on enterprise file transfer solutions to exchange data files with other entities, such as customers. Generally, such applications use a vendor-provided file transfer solution to submit data files to and retrieve data files from the enterprise file transfer solution. The enterprise file transfer solution may then proceed with the actual exchange of data files with the customers. For example, and in the context of payment networks, data files associated with electronic payment transaction clearing, settlement, payment card rewards, etc. are exchanged between the payment network applications and payment network customers, which can be payment card issuing banks, acquiring banks, merchants, etc.

SUMMARY

In accordance with one embodiment of the present disclosure, a method comprises creating a secure shell (SSH) file transfer protocol (SFTP) key using an SSH key administration portal. The method further comprises providing an SSH key passphrase to protect the SSH key. Further still, the method comprises sending the SSH key to one or more associated SFTP application programming interface (API) servers of a plurality of SFTP API servers via an administrative account implemented on the administration portal and adapted for centrally managing the plurality of SFTP API servers.

In accordance with another embodiment of the present disclosure, a method comprises transmitting a request to import a public secure shell (SSH) key associated with an SSH file transfer protocol (SFTP) server that owns a corresponding private SSH key via an administrative portal adapted to manage a plurality of SFTP servers. Additionally, the method comprises transmitting a request to associate the public SSH key with one or more SFTP application programming interface (API) servers to cause the public SSH key to be sent to each of the one or more SFTP API servers, wherein each of the one or more SFTP API servers is associated with a corresponding one of the plurality of SFTP servers. Additionally still, the method comprises maintaining the public SSH key at the administrative portal.

In accordance with yet another embodiment of the present disclosure, an application server comprises a secure file transfer protocol (SFTP) application programming interface (API) server adapted to receive an SSH key from an administration portal adapted to manage a plurality of SFTP API servers. Moreover, the application server comprises a secure SSH key store adapted to store the SSH key, a vault adapted to receive a passphrase for protecting the SSH key when authenticating a file transfer request by the application server.

BRIEF DESCRIPTION OF THE DRAWINGS

Further aspects of the present disclosure will be more readily appreciated upon review of the detailed description of its various embodiments, described below, when taken in conjunction with the accompanying drawings.

The drawings are described in greater detail in the description and examples below. The drawings are not intended to be exhaustive or to limit the various embodiments to the precise form disclosed. It should be understood that embodiments can be practiced with modification and alteration.

DETAILED DESCRIPTION

The details of some example embodiments of the methods and systems of the present disclosure are set forth in the description below. Other features, objects, and advantages of the disclosure will be apparent upon examination of the following description, drawings, examples and claims. It is intended that all such additional systems, methods, features, and advantages be included within this description, be within the scope of the present disclosure, and be protected by the accompanying claims.

As alluded to above, enterprise file transfer or exchange should be performed in a secure manner. One mechanism for transferring files, i.e., a secure file transfer protocol or SSH file transfer protocol (SFTP), is desirable given that it is a standardized protocol for secure file transfer that can be implemented in a variety of different operating systems (OSs) and/or application environments or platforms. SFTPs use of one of two authentication modes or forms of authentication (password-based authentication and key-based authentication (SSH key passphrases). Because passwords are generally more easily compromised, for example, by guessing or by managing to view the password, key-based authentication in SFTP, where an SSH key is required in order to allow an SFTP client to connect to an SFTP server to engage in a secure file transfer, is preferable.

Some systems and methods of secure file transfer operate in such a way that a passphrase can automatically be obtained from a secure vault, and used to retrieve an SSH key for use in initiating a file transfer. In particular, a vault can be used to securely store passphrases, where access to the vault is controlled by, e.g., a single sign-on identity that can be configured (pre-associated) to provide access to such passphrase(s) appropriate for that sign-on identity to have. Once a user has authenticated him/herself with an application or application server, operating system, etc., that single sign-on identity (also referred to as an application user ID) can be used to access the passphrase(s) stored in the vault. Once the passphrase is obtained, the passphrase can be used to retrieve the appropriate SSH key to effectuate a file transfer using SFTP. One such system implements SFTP, where application programming interfaces (APIs) are exposed between components using a Java Remote Method Invocation (RMI) client-server architecture (described in greater detail below).

However, certain enterprises, such as those operating in the payment transaction processing industry, utilize large numbers of applications and servers to implement their file transfer systems. Because most applications in such enterprises rely on a variety of platforms, managing SSH keys for hundreds of applications or servers across different platforms is an onerous task (requiring, e.g., individualized application server management) absent centralized control.

Therefore, various embodiments of the present disclosure are directed to systems and methods of centralized, global SSH key administration and management. Various embodiments can leverage the aforementioned SFTP API solution to integrate centralized SSH key administration across any and all SFTP API or other file transfer installations. This allows an administrative entity to use a central server, for example, to perform client and server SSH key administration and management (e.g., SSH key creation, removal, distribution, and expiration reporting/tracking), scheduling, configuration updates, and the like across an unlimited number of file transfer installations and platforms (and therefore, is also scalable). In accordance with various embodiments, a single management interface can be utilized for viewing and updating SSH keys for applications, and SSH keys can be propagated to application servers where the SSH keys can be activated based on a scheduled time.

As discussed previously, one example of an industry in which applications requiring secure file transfers are used is the payment transaction processing industry. Transaction processing of card-based payments can include both an authorization side and a clearance side. The authorization side may involve the process of confirming that a cardholder has a sufficient line of credit to cover a proposed payment. The clearance side of the transaction may involve the process of moving funds from an issuing bank to an acquiring merchant bank.

In the context of payment transaction processing, large numbers and/or batches of files and data (e.g., money files, rewards files, settlement clearing data, etc.) may be transferred between the payment network and its customers (e.g., to and from banks, merchants, etc.) as will be described in greater detail below. In order to effectuate the transfer of these files, an entity such as the payment network itself may customize web applications, or utilize proprietary frameworks/software such as secure transport managed file transfer software (MFTS).

Figure 1:
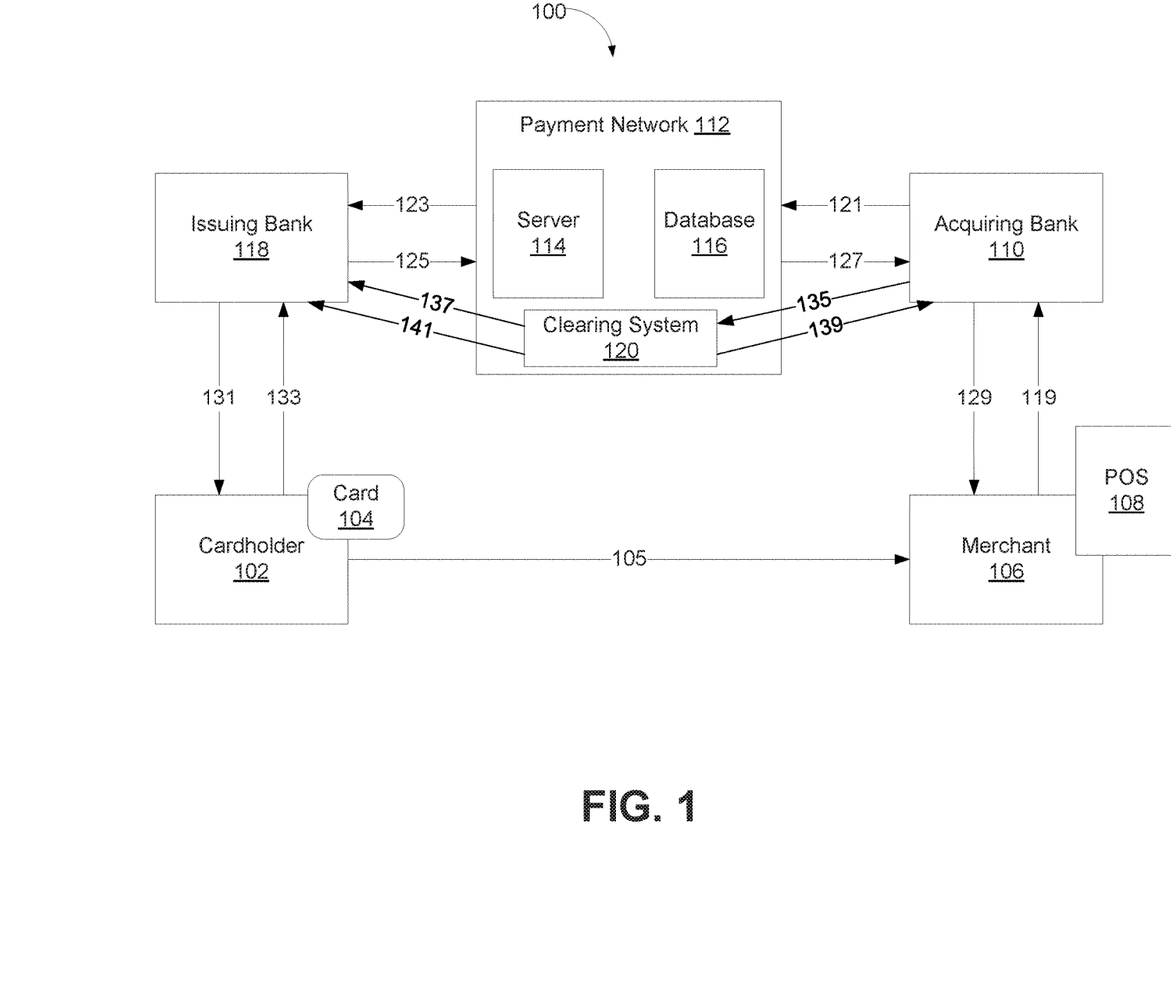
FIG. 1 illustrates an example payment card transaction processing system.

An example of a network and contextual environment in which various embodiments may be applicable will be illustrated and described. FIG. 1 depicts an example payment card transaction processing system 100 in which an application having a segmented architecture may be implemented in accordance with various embodiments.

In a typical card-based payment transaction system, a cardholder 102 presents a credit/debit/prepaid card 104 to a merchant 106 for the purchase of goods and/or services. This transaction is indicated by arrow 105. A "card" 104, as used herein, can refer to a conventional magnetic-stripe credit, debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. A "card" can further refer to virtual or limited use account numbers and electronic wallets.

It is understood that prior to the occurrence of such a transaction, cardholder 102 was issued card 104 by an issuing bank 118. Moreover, it will be understood that merchant 106 has established a relationship with an acquiring bank 110, thereby allowing merchant 106 to receive payment cards as payment for goods and/or services. That is, merchant banks and issuing banks may participate in various payment networks, including payment network 112. One such payment network is the one operated by MasterCard International Incorporated, the assignee of the present disclosure.

After presentation of payment card 104 to merchant 106 by cardholder 102, merchant 106 may send an authorization request (indicated by arrow 119) to acquiring bank 110 via a point-of sale (POS) terminal 108 located at or otherwise controlled by merchant 106. In turn, acquiring bank 110 communicates with payment network 112 (indicated by arrow 121), and payment network 112 communicates with issuing bank 118 (indicated by arrow 123) to determine whether issuing bank 118 will approve the transaction 105 that cardholder 102 is attempting to make. An approval or disapproval of the authorization request is thereafter transmitted back to merchant 106 (indicated by arrows 125, 127 and 129). Merchant 106 may then either complete or cancel transaction 105 based upon the response to the authorization request.

If transaction 105 is approved, the transaction amount will be sent from issuing bank 118 through payment network 112 to acquiring bank 110. The transaction amount, minus certain fees, will thereafter be deposited within a bank account belonging to merchant 106. Issuing bank 118 may then bill cardholder 102 (indicated by arrow 131) for the transaction amount by sending a periodic cardholder statement. Cardholder 102 follows by submission of payment(s) (as indicated by arrow 133) to issuing bank 118. This submission of payment(s) (as indicated by arrow 133) by cardholder 102 may be automated (e.g., in the case of debit transactions), may be initiated by cardholder 102 for the exact amount matching the total cost of all purchases during the statement period (e.g., charge cards or credit balances paid in full), and/or may be submitted (in part or in whole) over a period of time that thereby reflects the costs of the purchases plus any financing charges agreed upon beforehand between cardholder 102 and issuing bank 118 (e.g., revolving credit balances).

Payment network 112 preferably includes at least one server 114 and at least one database 116. Server 114 may include various computing devices such as a mainframe, personal computer (PC), laptop, workstation or the like. Server 114 can include a processing device and be configured to implement an authorization and clearance process, which can be stored in computer storage associated with server 114. Database 116 may include computer readable medium storage technologies such as a floppy drive, hard drive, tape drive, flash drive, optical drive, read-only memory (ROM), random access memory (RAM), and/or the like. Server 114 and database 116 may be controlled by software/hardware and may store data to allow it to operate in accordance with aspects of the present disclosure.

POS terminal 108 is in data communication, directly or indirectly, and at least from time to time, with, e.g., an acquirer host computer (not shown) that is part of payment network 112 and is operated for or on behalf of acquiring bank 110, which handles payment card transactions for merchant 106. Server 114 may be operated by or on behalf of the payment network 112, and may provide central switching and message routing functions among the member financial institutions of the payment card association. Issuing bank 118 also preferably makes use of an issuer host computer (not shown), and an access point (not shown) via which the issuer host computer exchanges data messages with server 114. It should be noted that in practice, payment card transaction processing system 100 may involve a large number of cardholders, POS terminals, acquirer host computers, issuer host computers, and access points. In general, the acquirer host computer can receive authorization requests from POS terminals, forward the authorization requests through payment network 112, receive authorization responses, and relay the authorization responses to POS terminal 108. Moreover, the issuer host computer may in general, receive authorization requests from server 114 and transmit authorization responses back to server 114 with respect to the authorization requests.

The use of payment cards for a broad spectrum of cashless transactions has become ubiquitous in the current economy, accounting for hundreds of billions of dollars in transactions during a single year. For example, MasterCard International Incorporated processes upwards of 160 million transactions per hour in over 230 countries. It should be appreciated that the amount of information and resources (e.g., technology assets) involved in performing and coordinating payment transactions, at any point in payment card transaction processing system 100 is enormous.

A payment network may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include gift cards, personalized gift cards, payment cards, letters of credit, checks, financial accounts, etc. Accordingly, a payment network relies on variety of resources, such as various hardware and/or software platforms, databases, internal networks, etc.

To carry out a file transfer from one party to another, Global File Transfer (GFT) takes advantage of in-place connectivity and may offer file transfer protocol (FTP) services. A file transfer may be carried out because of a relationship with a member and a vendor/third party. As will be appreciated by those of ordinary skill in the art, GFT is a system available from MasterCard International Incorporated wherein files are transferred over a payment network of the kind shown in FIG. 1, and is a non-limiting example of data file transfer via a payment network.

There are a number of methods of passing a file through a payment system; for example: a virtual private network (VPN) or the Internet—using a suitable secure technique for communicating data over the Internet, for example, an existing method such as MasterCard International Incorporated's MFE (MASTERCARD FILE EXPRESS), FTX (File Transfer Express), or the aforementioned SFTP technique or similar techniques. As will be appreciated by those of ordinary skill in the art, the same are generally representative of so-called Straight-Through-Processing (STP) techniques which enable electronic payments to flow seamlessly from, for example, a company's Accounts Payable system, through the banking infrastructure, and to a vendor's Accounts Receivable system. Note that in at least some instances, STP techniques can also be employed in connection with the above-discussed VPN file transfer. An STP Transaction Set was developed by the Electronic Payments Network and represents a widely adopted standardized format that may be employed in one or more embodiments. Those of ordinary skill in the art will also appreciate that MasterCard File Express is an example of an application (accessible online) which handles both the compression and encryption of data for (secure) transmission.

An API/RMI client-server architecture may be utilized in accordance with various embodiments, where SSH keys are utilized for data transfer. SSH keys may be installed under an application user/administrative/administrator account. Any calling client would be aware of an SSH key's file name and location, and an associated passphrase(s) and cryptolabel.

Figure 2:
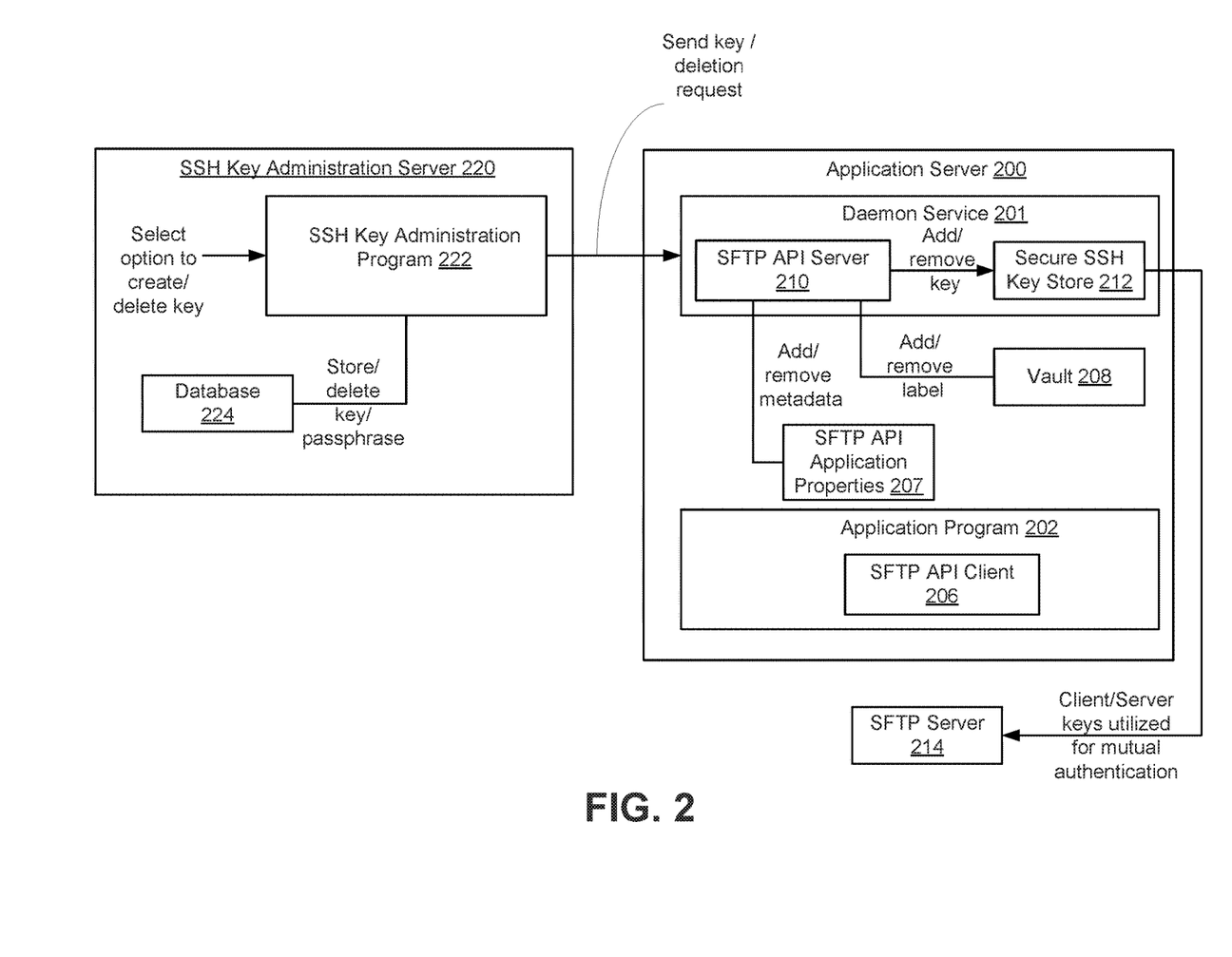
FIG. 2 illustrates an example administration and application server architecture for implementing secure file transfer with SSH key administration in accordance with various embodiments.

FIG. 2 illustrates an example file transfer architecture in accordance with various embodiments of the present disclosure. The file transfer architecture includes an application server 200 and an SSH key administration server 220. Within application server 200, an application program 202 may be implemented. Application server 200 and application program 202 can communicate with a (remote) SFTP server 214 to effectuate secure file transfer in accordance with various embodiments. It should be noted that SFTP server 214 may be a payment network SFTP gateway server to which data files can be transferred in order to enter into the payment network enterprise file transfer system/solution, and out to, e.g., a customer.

As described above, application program 202 may be an example of an application involving data transfer using SFTP techniques. Within application program 202, a data file may be created and a file transfer request initiated. Thus, the API/RMI client (in this example, an SFTP API client 206) may be invoked.

It should be noted that various embodiments are implemented in Java, an object-oriented language, which means that the code is associated with a class of objects. An object is a simulated data structure which behaves according to the specifications of its class—the act of making Java code involves creating and altering these classes. Specific class behaviors are defined by snippets of code called "methods," and properties of objects and classes are defined by "variables." Java is utilized in various embodiments because Java is OS/platform agnostic and lends itself to use in architectures or environments having a plurality of OSs or platforms are used, such as Windows, Linux, Unix, AIX, etc.

Java's functionality comes from its API. It can handle complex data structures, sorting algorithms, networking protocols, classes and methods to create graphical user interfaces, and more. APIs are exposed between components using the Java RMI interface. The Java RMI is an API that performs the object-oriented equivalent of remote procedure calls (RPC) with support for direct transfer of serialized Java classes and distributed garbage collection. Although various embodiments are described herein as being implemented using Java, other programming languages or schema may be used to implement the features described herein.

Referring back to FIG. 2, invocation of SFTP API client 206 involves fetching and reading a passphrase from vault 208. As previously discussed, a vault or other secure repository, such as vault 208, can be utilized to securely store passphrases used to retrieve SSH keys to authenticate a file transfer. Access to vault 208, as also discussed above, is premised upon, e.g., an authentication ID used to authenticate a user to application server 200/application program 202. In other words, the process that has access to the SSH key passphrase is based on the identity used to run or execute the application.

The file transfer request is passed to SFTP API server 210, which, if the proper passphrase has been retrieved, can be used to access the SSH key from secure SSH key store 212. It should be noted that the client (in this example, SFTP API client 206) calling the SFTP API has the passphrase in order to use the SSH key, but the client need not necessarily "see" the SSH key. That is, the SSH key can be considered to be "owned" by SFTP API server 210 that only it can access. Once the SSH key is retrieved, the file transfer request can be authenticated (i.e., mutually authenticated client/server SSH keys) and the desired data file(s) can be transferred via SFTP to SFTP server 214.

It should be noted that SFTP API client 206 and SFTP API server 210 are both physical host platforms and resident application software engaged as either a client or server role in a file transfer/exchange. As utilized herein, these terms are intended to represent respective, entire logical entities. Similarly, vault 208 represents a secure data store and also a library with exposed methods for accessing secure tokens in that secure data store.

SSH key administration server 220 can be utilized to manage SSH keys vis-à-vis an SSH key administration program 220 (for example, a web-based application having SFTP API libraries and communication channels) resident and executable thereon. For example, an authorized user or administrator can utilize SSH key administration program 220 to perform the following functions: authenticate to a remote SFTP API instance (i.e., authenticating to STFP server 214, for example, for supplying updated configuration information/data and/or SSH keys); creating a new client SSH key pair and distributing the SSH key pair to an SFTP API instance which may include sending an SSH private key passphrase to add to a vault instance; sending an encrypted file containing configuration data (e.g., an extensible markup language (XML) file) to be consumed by the remote SFTP API instance; distribute a server SSH key to an SFTP API instance; and remove an SSH key from an SFTP API instance. Database 224 (which can be an Oracle® database) may be used to store SSH keys and passphrases.

In particular, SSH Key Administration program 222 is configured to authenticate to all SFTP API servers defined in a system, e.g., SFTP API Server 210. Accordingly, an SSH key can be stored in a database 224 that will authenticate to all SFTP API servers as an authorized administrative account holder.

Figure 3A:
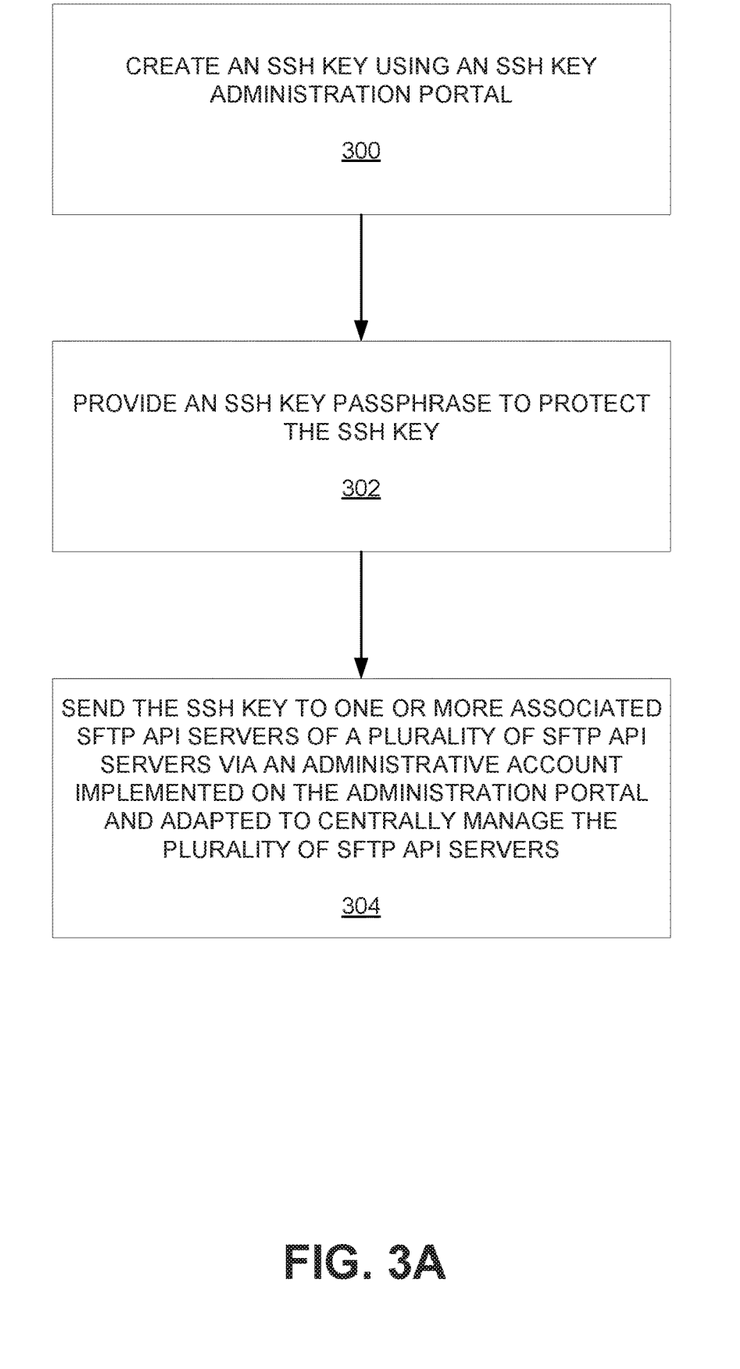
FIG. 3A is a flowchart illustrating example processes performed by an application server to create an SSH key in accordance with various embodiments of the present disclosure.

FIG. 3A is a flow chart illustrating example operations that may be performed by application server 200 to effectuate SSH key creation in accordance with various embodiments. At operation 300, an SSH key is created. In particular, an authorized user or administrator can select an option in SSH key administration program 222 to create an SSH key. In some embodiments, the SSH key is private SSH key that is part of an SSH key pair that also includes a public SSH key. The private SSH key can be created as an RSA key type with a default key size of 2048 bits. The authorized user may have the option to increase the key size to 3072 or 4096 bits and may also provide a comment to embed in the SSH key. It should be noted that RSA keys may be key pairs with a unique relationship—that any data encrypted with one key can be decrypted with the other key. Both keys of the key pair can be, e.g., very large prime numbers that have this unique relationship. Exchanging data securely typically uses a public key for encryption and a private key for decryption. Signing operations use digests and encryption with the private key that can be subsequently validated using the public key. This is the functionality on which public key infrastructures (PKI) capabilities are based. SSH also uses a shared symmetric session key that can occur after the PKI handshake completes.

At operation 302, a passphrase is provided for protecting the private SSH key. The private SSH key and passphrase can be stored in database 224 using, for example, transparent data encryption (TDE) to securely store the private SSH key and passphrase. The private SSH key may also be associated with a valid use/expiration time period, e.g., a time when the private SSH key is scheduled to become usable and for how long/a time when it will expire. Moreover, the private SSH key is associated with one or more SFTP API instances, such as SFTP API Server 210.

At operation 304, the SSH key (i.e., the SSH key pair) is sent to one or more associated SFTP API servers of a plurality of SFTP API servers via an administrative account adapted to centrally manage the plurality of SFTP API servers. That is, and upon construction or generation of the private SSH key, it is sent to each of the associated SFTP API instances using an SFTP transfer function. That is, the private SSH key can be sent from SSH key administration server 220/program 222 to SFTP API server 210 in daemon service 201 of application server 200. In the event, the private SSH key is a private, client SSH key, the private SSH key file can be uploaded to a client key directory on the SFTP API instance. The passphrase and availability data for the private SSH key can be embedded in an XML file and sent to the SFTP API instance using SFTP as well. That is, an SFTP API server, e.g., SFTP API server 210, may receive key pairs from a centralized management server. The key passphrase is also supplied by the centralized management server, e.g., SSH key administration server 220/program 222, and are then retained locally secure in, e.g., vault 208. The stored keys can then be used for authentication by SFTP API server 210 when connecting to remote SFTP servers for file exchanges. Additionally, the private SSH key and passphrase and availability data can be stored in a configuration updates directory of the SFTP API instance. In the example system of FIG. 2, the private SSH key may be stored in secure SSH key store 212, the passphrase can be stored in vault 208, and any applicable metadata can be stored in an SFTP API application properties component 207. It should be noted that the XML file can be held in memory but not be written to disc. This is because the XML file received from SSH key administration server 220/program 222 may contain a passphrase for an SSH key. One advantage of keeping the XML file in memory is that the passphrase is never persisted to disc in an unencrypted format, thereby ensuring the secrecy of the passphrase value. Because an administrator or authorized user account is utilized for the transmission of the SSH key and/or XML file, it can be recognized as a configuration update. In some embodiments, only the XML file is transmitted when just the metadata, e.g., passphrase or availability date is being updated.

In the same vein, using SSH key administration server 220/program 222, the authorized user or administrator can select the option to remove a client or server SSH key from one or more SFTP API instances. An XML file can be sent to the affected SFTP API instances with metadata indicating the action required (removal/deletion) and the identity of the SSH key to be removed. Additionally, database 224 will be updated to reflect the change in configuration as each SFTP API instance is successfully updated.

Figure 3B:
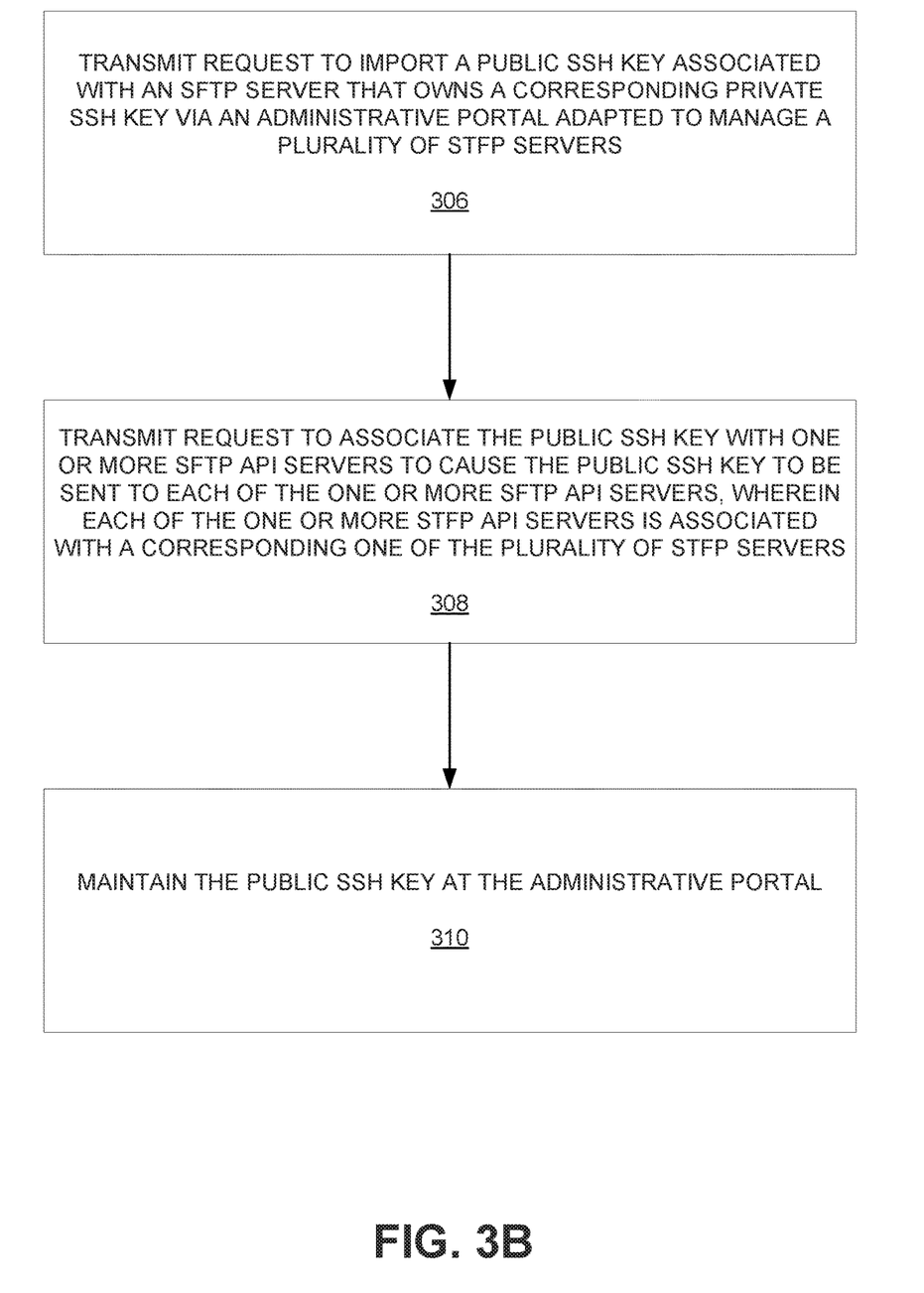
FIG. 3B is a flowchart illustrating example processes performed by an administration server to initiate SSH key distribution in accordance with various embodiments of the present disclosure.

FIG. 3B is a flow chart illustrating example processes performed by an administration portal to initiate SSH key distribution. At operation 306, a request to import a public SSH key associated with an SFTP server that owns a corresponding private SSH key is transmitted via an administrative portal adapted to manage a plurality of SFTP servers, e.g., SSH key administration server 220. Using SSH key administration program 222, an authorized user or administrator can select the option to import a public SSH key. The public SSH key should be associated with a host name and port number identifying the SFTP server, e.g., STFP server 214, that owns the corresponding SSH private key. The authorized user will have the option to also enter comments about the public SSH key and to set an expiration for the public SSH key. By default, the public SSH key will be set to expire four years after the date of import, but the expiration time period can be any desired time period.

At operation 308, a request to associate the public SSH key with one or more SFTP API servers is transmitted to cause the public SSH key to be sent to each of the one or more SFTP API servers, wherein each of the one or more SFTP API servers is associated with a corresponding one of the plurality of SFTP servers. That is, the authorized user may associate any number of SFTP API servers, e.g., SFTP API server 210, with the public SSH key to cause the key to be sent to the indicated SFTP API servers. The metadata associated with the public SSH key can also be sent to the SFTP API servers embedded in an XML file. Again, the XML file can be managed in memory and but not written to disc. At operation 310, the public SSH key can be maintained at the administrative portal. In this example, the public SSH key and associated metadata can be stored in database 224.

It should be noted that in various embodiments, SFTP API installations, e.g., a combination of an SFTP API server and an SFTP API software installation, can have a default account defined that allows the SSH key hosted in the SFTP API administration server 220/program 222 to authenticate as an administrative account. When an SFTP API client, e.g., SFTP API client 206, authenticates using an administrative account, the SSH key files are allowed to be uploaded to the SSH API client key directory in the corresponding SFTP API instance. However, in some embodiments, the client SSH keys are not be usable until the corresponding administrative account also uploads an XML file with the associated availability date and passphrase for the client SSH key. The XML file will be consumed by the SFTP API server, e.g., SFTP API server 210, the passphrase will be added to value 208, the metadata, e.g., availability date, will be added to SFTP API application properties component/file 207. Yet again, the XML file will be kept in memory but nor written to disc.

An SFTP API client, e.g., SFTP API client 206, authenticated as an administrative account holder can upload a public SSH key to a configured SSH server key file directory. However, no action will be taken on the uploaded public SSH key (file) until a corresponding XML file is uploaded with metadata about the public SSH key identifying the remote host, e.g., SFTP server 214, that owns the corresponding private SSH key and the expiration date for the public SSH key. Once the metadata is available, the public SSH key can be added to a "known hosts" repository on the SFTP API instance and the expiration for the public SSH key can be added to SFTP API application properties component/file 207.

Similarly, an SFTP API client, e.g., SFTP API client 206, authenticated as an administrative account holder, can upload an XML file containing metadata identifying a client or server SSH key that needs to be removed. The SFTP API server 210 will remove the physical SSH key file and any associated metadata from SFTP API application properties component/file 207. For client SSH keys, it will also remove the passphrase label from vault 208.

It should be noted that although various embodiments of the present disclosure have been presented and described in the context of payment card transaction file/data transfer, the disclosed concept of automated passphrase/secure key authentication is generally applicable, and other embodiments are contemplated for implementation in any other context to allow for more efficient application use and/or operation. For example, in some embodiments, patch updates to one or more systems/servers can be centrally managed in a similar manner, where patch updates can be sent to SFTP/SFTP API servers. In general, a key can be created within an administration tool or environment, or a remote key can be imported and sent to an API server that can be used for authentication (of the API server or as a client) when connecting to a remote SFTP server, as well as transmitting information regarding valid directories, etc.

Accordingly, a single portal can be utilized for enterprise-level administration. The risk associated with manual key administration can also be eliminated, and the scope of direct access to application servers can be reduced. moreover, coordinated administrative key changes can be easily and efficiently coordinated.

Figure 4:
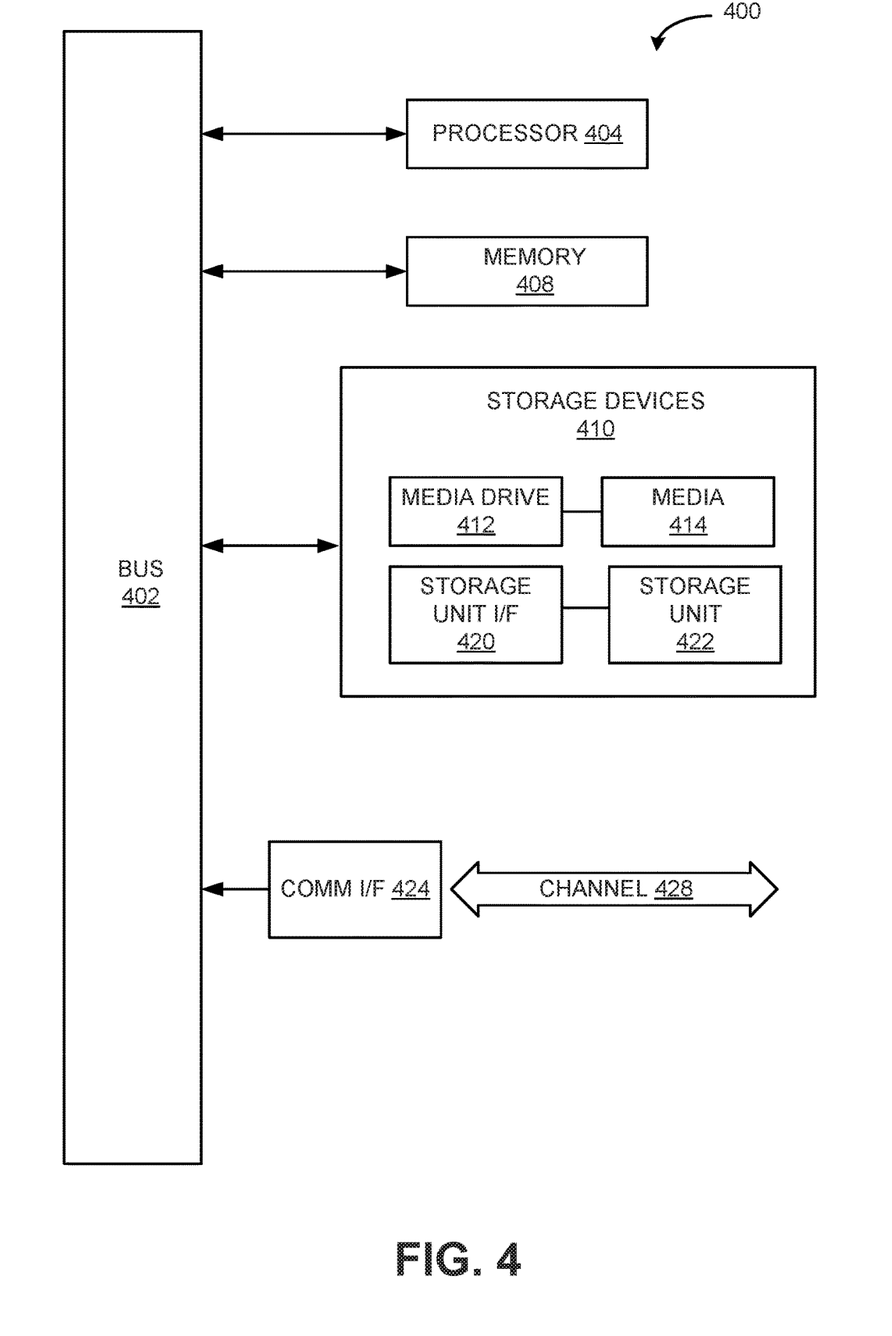
FIG. 4 illustrates an example computing component that may be used in implementing features of various embodiments of the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

FIG. 4 illustrates an example computing component 400, an example of which may be a processor for executing the business ecosystem tool used to implement various features and/or functionality of the systems and methods disclosed in the present disclosure. Computing component 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage devices 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage devices 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    creating a secure shell (SSH) file transfer protocol (SFTP) key using an SSH key administration portal;
    providing an SSH key passphrase to protect the SSH key, wherein the SSH key comprises at least one of a private SSH key portion of an SSH key pair and an RSA key type;
    sending the SSH key to one or more associated SFTP application programming interface (API) servers of a plurality of SFTP API servers via an administrative account implemented on the administration portal and adapted for centrally managing the plurality of SFTP API servers;
    storing the SSH key and the SSH key passphrase in a database associated with the SSH key administration portal;
    providing an availability period regarding the SSH key;
    generating an extensible markup language (XML) file in which the SSH key passphrase and data indicative of the availability period are embedded;
    storing the SSH key passphrase in a security repository; and
    obtaining the SSH key passphrase to authenticate a secure file transfer of a file from the one or more associated SFTP API servers to one or more remote SFTP servers by accessing the passphrase from the secure repository;
    wherein accessing of the passphrase is premised upon a user authentication ID for authenticating a user to an application requiring the secure file transfer of the file.

2. The method of claim 1, wherein the one or more SFTP API servers retrieves the SSH key from a secure key store, and wherein the SSH key remains hidden from an application requiring the secure file transfer of the file.

3. The method of claim 1, wherein the SSH key comprises one of an SFTP API client key or an SFTP server key.

4. The method of claim 1, further comprising removing the SSH key from the one or more associated SFTP API servers via the XML file indicating a removal action and an identity of the SSH key.

5. The method of claim 4, further comprising updating a database associated with the administration portal in which the SSH key is stored to reflect removal of the SSH key.

6. An application server, comprising:
    a memory component comprising one or more memory devices providing main memory for the application server;
    one or more processor to implement secure file transfer of the file;
    a secure file transfer protocol (SFTP) application programming interface (API) server adapted to create an SSH key using an administration portal adapted to manage a plurality of SFTP API servers;
    a SSH key passphrase provided to protect the SSH key, wherein the SSH key comprises at least one of a private SSH key portion of an SSH key pair and an RSA key type;
    a secure SSH key store associated with the administration portal adapted to store the SSH key, the SSH key passphrase, and an availability period related to the SSH key;
    an XML file generated, by the one or more processor, to embed the passphrase and data indicative of the availability period; and
    a vault adapted to store the SSH key passphrase, wherein the SSH key passphrase is obtained from the vault when authenticating a file transfer request by the application server;
    wherein the plurality of SFTP API servers are configured to authenticate the secure file transfer of a file to one or more remote SFTP servers by accessing the passphrase from the vault; and
    wherein accessing of the SSH key passphrase is premised upon a user authentication ID for authenticating a user to an application requesting the secure file transfer of the file.

7. The application server of claim 6, further comprising an SFTP API application properties component adapted to store metadata associated with the SSH key.

8. The application server of claim 7, wherein the metadata comprises at least data indicative of an availability of the SSH key.

* * * * *